(No Model.)

J. OWENS.
CUTTING ATTACHMENT FOR PLOWS.

No. 345,916. Patented July 20, 1886.

WITNESSES.
Chas. A. Suffrins
Chas. L. Thurber

INVENTOR.
James Owens,
PER
C. Bradford,
ATTORNEY.

UNITED STATES PATENT OFFICE.

JAMES OWENS, OF RUSSELLVILLE, INDIANA, ASSIGNOR OF ONE-HALF TO SEBASTIAN DURR, OF SAME PLACE.

CUTTING ATTACHMENT FOR PLOWS.

SPECIFICATION forming part of Letters Patent No. 345,916, dated July 20, 1886.

Application filed April 26, 1886. Serial No. 200,130. (No model.)

*To all whom it may concern:*

Be it known that I, JAMES OWENS, of the town of Russellville, county of Putnam, and State of Indiana, have invented certain new and useful Improvements in Cutting Attachments for Plows, of which the following is a specification.

My said invention consists in certain improvements upon that for which Letters Patent No. 302,932 were granted me under date of August 5, 1884, whereby the device may be more easily attached and removed from the plow, and also rendered adjustable both as a whole and as to the several parts.

Figure 1:
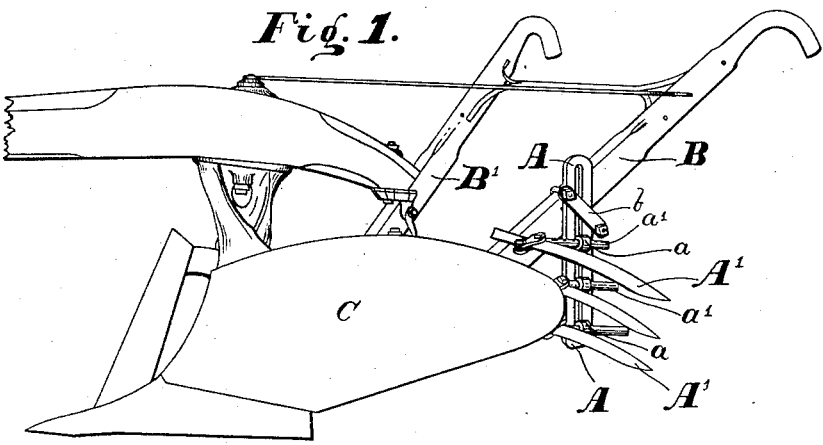
Figure 2:
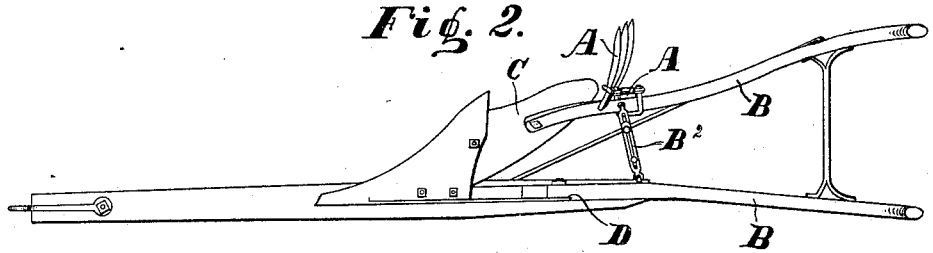
Figure 3:
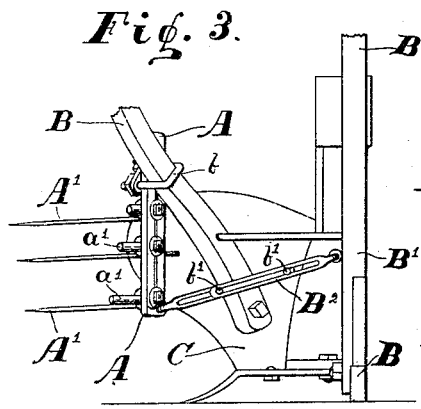
Figure 4:
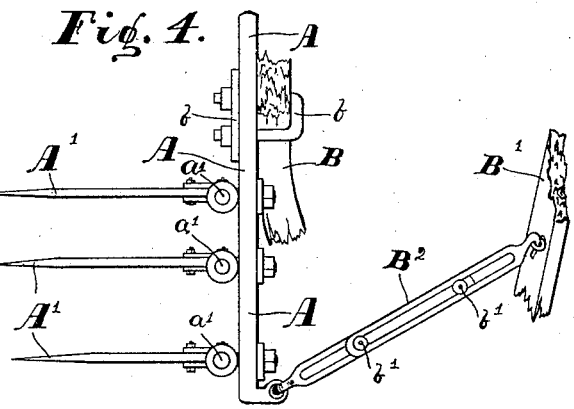

Referring to the accompanying drawings, which are made a part hereof, and on which similar letters of reference indicate similar parts, Figure 1 is a perspective view of a plow provided with my improved cutting attachment; Fig. 2, an under side plan of the same; Fig. 3, a rear elevation, and Fig. 4 a detail view of the cutting attachment separately.

The attachment is shown as consisting of a base, A, formed of two parallel parts secured together at the ends, or a slotted plate, and through the slot are passed eyebolts $a$, in which are mounted the shanks $a'$ of the knives A'. The main portion A is secured to the handle B by a clip, $b$, and its lower end is secured to the handle B' or the landside D by a brace, B², which is preferably made adjustable by being slotted, and having bolts $b'$ passing through the slots and connecting the two parts, as shown. By this means the attachment may be adjusted to fit any plow by simply loosening these bolts and extending the brace as required, said brace being connected to the handle or landside by an eye secured therein, as usual.

The device as a whole may be adjusted vertically by securing it at a higher or lower point on the handle B, or by sliding the part A through the clip, and then tightening the clip, as desired. The knives A' may be adjusted to any inclination desired in one direction by moving them in the clamped ends of their shanks $a'$, and tightening the bolts of said clamp ends to hold them in the desired position, and may be adjusted in the other direction by rotating the shanks in the eyebolts, and then tightening said eyebolts, as will be readily understood. They could also be adjusted bodily in a vertical direction by moving the eyebolts up and down in the slot.

As in my former patent, the invention is shown as attached to a common or walking plow, but is intended also to be used with sulky-plows.

Having thus fully described my said invention, what I claim as new, and desire to secure by Letters Patent, is—

1. The combination, with a plow, of a cutting attachment consisting of a base carrying cutting-knives, a clip by which said base is secured to one handle, and an extensible brace, B², by which it is also secured to the other handle or the landside, substantially as shown and described.

2. The combination of the plow, the base A, the clip $b$, the adjustable brace B², and the cutting-knives A', adjustably secured to said base A.

3. The combination of the slotted base A, eyebolts passing through said slots, knife-shanks mounted in said eyebolts and having clamp ends, and cutting-knives mounted in said clamp ends, the whole forming a cutting attachment for plows, substantially as set forth.

In witness whereof I have hereunto set my hand and seal, at Indianapolis, Indiana, this 16th day of April, A. D. 1886.

JAMES OWENS. [L. S.]

In presence of—
C. BRADFORD,
CHARLES L. THURBER.